(12) United States Patent
Vogler

(10) Patent No.: US 10,040,243 B2
(45) Date of Patent: Aug. 7, 2018

(54) SURFACE-STRUCTURED PROCESSING ELEMENT FOR ULTRASONIC PROCESSING

(71) Applicant: Herrmann Ultraschalltechnik GmbH & Co. KG, Karlsbad (DE)

(72) Inventor: Ulrich Vogler, Uhldingen-Muhlhofen (DE)

(73) Assignee: HERRMANN ULTRASCHALLTECHNIK GMBH & CO. KG, Karlsbad (DE)

( * ) Notice: Subject to any disclaimer, the term of this patent is extended or adjusted under 35 U.S.C. 154(b) by 0 days.

(21) Appl. No.: 15/503,659

(22) PCT Filed: Oct. 14, 2015

(86) PCT No.: PCT/EP2015/073824
§ 371 (c)(1),
(2) Date: Feb. 13, 2017

(87) PCT Pub. No.: WO2016/062596
PCT Pub. Date: Apr. 28, 2016

(65) Prior Publication Data
US 2017/0266872 A1 Sep. 21, 2017

(30) Foreign Application Priority Data
Oct. 24, 2014 (DE) .................. 10 2014 115 538

(51) Int. Cl.
*B32B 37/00* (2006.01)
*B29C 65/08* (2006.01)
(Continued)

(52) U.S. Cl.
CPC .............. *B29C 65/087* (2013.01); *B06B 3/00* (2013.01); *B23K 20/10* (2013.01); *B29C 65/086* (2013.01);
(Continued)

(58) Field of Classification Search
CPC ..... B29C 65/08; B29C 65/086; B29C 65/087; B29C 66/1122; B29C 66/232;
(Continued)

(56) References Cited

U.S. PATENT DOCUMENTS 5,711,847 A 1/1998 Rajala
8,925,610 B2 * 1/2015 Brolli .................. B65B 7/02
156/515
(Continued)

FOREIGN PATENT DOCUMENTS

DE 101 23 632 A1 11/2002
EP 1 216 612 A2 6/2002
(Continued)

OTHER PUBLICATIONS

Nora Lindner, International Preliminary Report on Patentability, PCT/EP2015/073824, World Intellectual Property Organization, dated Apr. 27, 2017.

*Primary Examiner* — James Sells
(74) *Attorney, Agent, or Firm* — Paul & Paul

(57) ABSTRACT

The present invention concerns a processing element for processing a material, like for example a sonotrode or an anvil, comprising a carrier surface which is substantially in the form of a cylinder or in the form of a segment of a cylinder and which is intended to come into contact with the material during processing, wherein the processing element is intended to be rotated about its longitudinal axis during processing so that the carrier surface rolls on the material to be processed, wherein arranged on the carrier surface is at least one structure element which projects beyond the carrier surface in the radial direction, wherein the structure element has a top side which is provided to come into contact with the material to be processed. To provide a processing element which reduces the abrupt deflection of the sonotrode when the material comes into engagement with and/or
(Continued)

comes out of engagement with the carrier surface it is proposed according to the invention that the top side is at least portion-wise convexly curved in the peripheral direction with a radius of curvature which is less than the greatest spacing of the top side from the cylinder axis or comprises at least two surface portions which include an angle <180°.

14 Claims, 6 Drawing Sheets

(51) Int. Cl.
    *B06B 3/00*     (2006.01)
    *B23K 20/10*     (2006.01)
    *B29C 65/00*     (2006.01)

(52) U.S. Cl.
    CPC ........ *B29C 66/1122* (2013.01); *B29C 66/232* (2013.01); *B29C 66/4312* (2013.01); *B29C 66/81435* (2013.01); *B29C 66/83511* (2013.01); *B29C 66/9221* (2013.01); *B29C 66/9241* (2013.01); *B29C 66/95* (2013.01); *B29C 66/961* (2013.01); *B29C 66/962* (2013.01)

(58) Field of Classification Search
    CPC .......... B29C 66/4312; B29C 66/81435; B23K 20/10; B06B 3/00
    USPC ............................................ 156/580.1, 580.2
    See application file for complete search history.

(56) References Cited

U.S. PATENT DOCUMENTS

| | | |
|---|---|---|
| 2002/0062901 A1 | 5/2002 | Couillard |
| 2004/0040639 A1 | 3/2004 | Keen |
| 2007/0007320 A1 | 1/2007 | Stroh |
| 2010/0218881 A1 | 9/2010 | Yamamoto |
| 2014/0033653 A1* | 2/2014 | Cham ................ B29C 65/085 53/452 |
| 2014/0034213 A1* | 2/2014 | Cham ................ B29C 65/08 156/73.1 |

FOREIGN PATENT DOCUMENTS

| | | |
|---|---|---|
| GB | 2 437 238 A | 10/2007 |
| JP | H10-35 619 A | 2/1998 |
| JP | 2013 216023 A1 | 10/2013 |

* cited by examiner

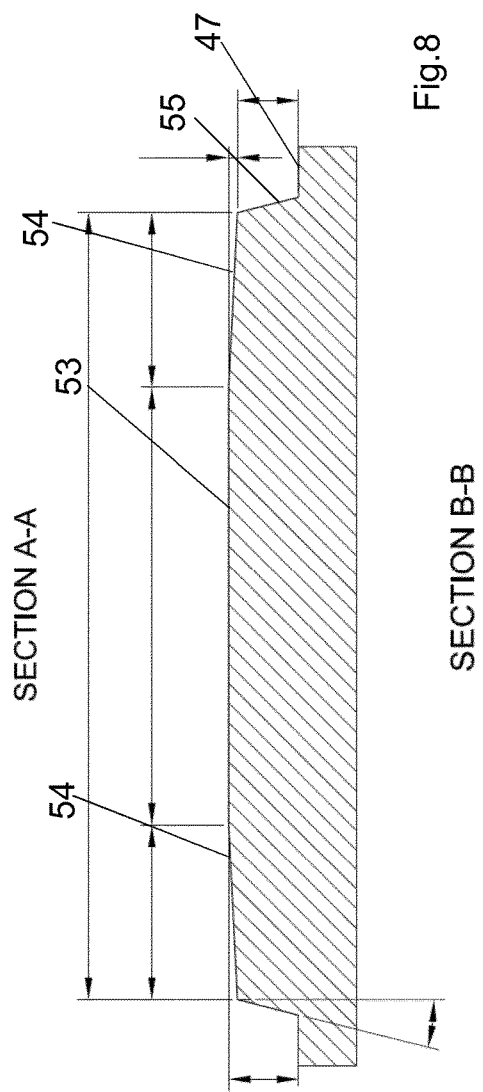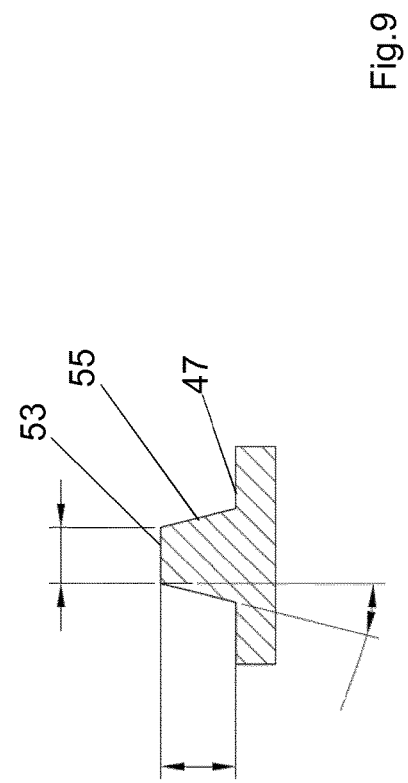

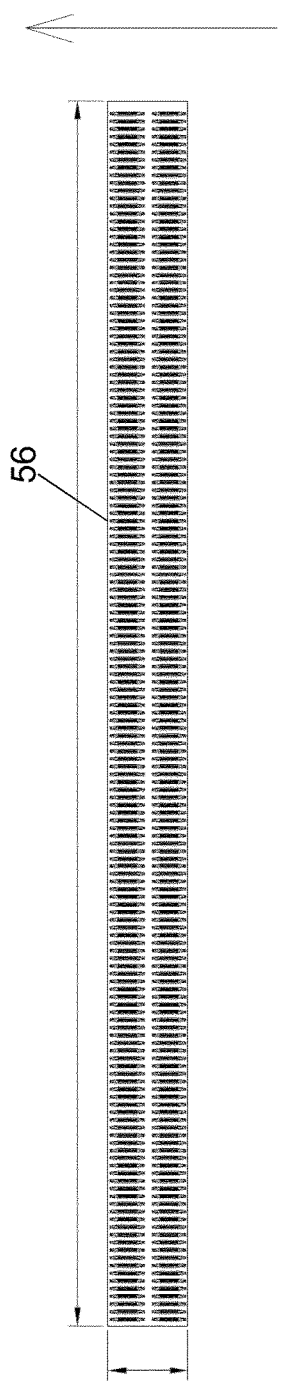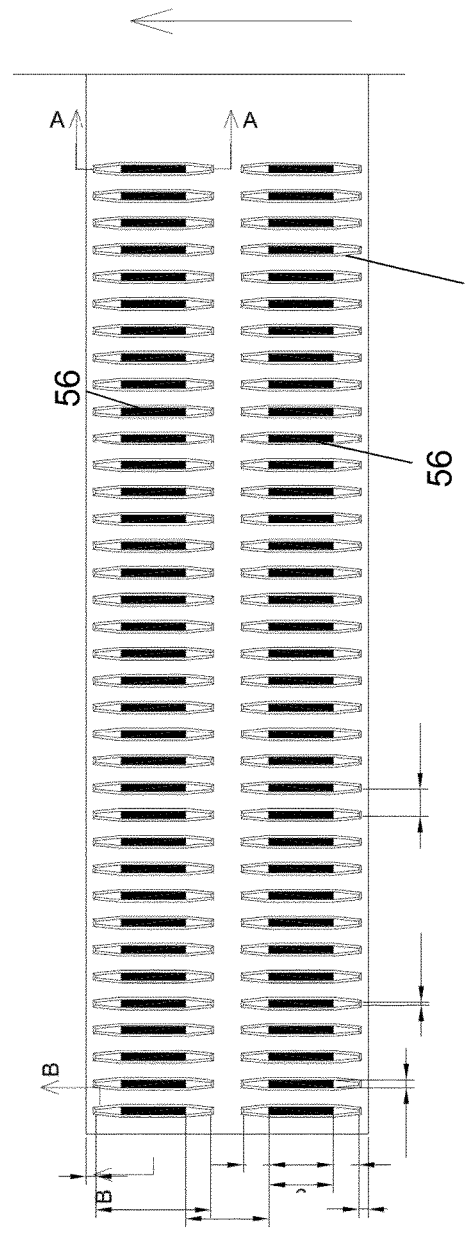

SURFACE-STRUCTURED PROCESSING ELEMENT FOR ULTRASONIC PROCESSING

CROSS-REFERENCE TO RELATED APPLICATION

This application is a 371 national stage application of International Application PCT/EP2015/073824, filed Oct. 14, 2015, and claims the priority of German Application No. 10 2014 115 538.6, filed on Oct. 24, 2014.

The present invention concerns a processing element for processing a material comprising a carrier surface which is substantially cylindrical or in the form of a segment of a cylinder. During processing the processing element is rotated about its longitudinal axis so that the carrier surface rolls against the material to be processed. In that respect both the processing elements which have a cylindrical carrier surface and which roll on the material to be processed and in so doing produce for example a continuous longitudinal seam and also processing elements which have only one—or more—carrier surface or surfaces in the form of a segment of a cylinder so that when the processing element rotates the carrier surface in the form of a segment of a cylinder comes into contact with the material to be processed only once per revolution in order for example to produce a transverse sealing seam are known.

In particular when such a processing element is used for ultrasonic processing of materials it is generally referred to as a sonotrode if it is acted upon with an ultrasonic vibration or an anvil if it is arranged opposite a sonotrode.

For example an ultrasonic processing apparatus can have both a sonotrode in a roller form and also an anvil in a roller form, between which the material in web form is passed and is processed while the material is pressed by the sonotrode in the direction of the anvil.

The carrier surface of the anvil is frequently structured, that is to say it has at least one structure element but in general a plurality of structure elements which project beyond the carrier surface in the radial direction. In some cases instead thereof or in addition thereto the carrier surface of the sonotrode is correspondingly structured. The structure elements serve to weld the material during the processing operation and possibly to emboss on the material a corresponding pattern or—if the structure elements are in the form of a logo—a logo.

In the state of the art the structure elements have a flat top side which is intended to come into contact with the material to be processed, and peripherally extending side surfaces which join the top side to the carrier surface. After processing with the processing element the processed material has a corresponding surface embossing. The top sides of the structure elements together form the so-called sealing surface.

In principle the processing element can be used not only for ultrasonic processing of materials but also for example for producing hot sealing seams.

Hereinafter however the invention is described with reference to a processing element for ultrasonic processing, in particular by reference to an anvil with corresponding structure elements. It will be understood however that all features described hereinafter could also be implemented on a sonotrode and in addition could also be used in relation to other processing methods.

There are ultrasonic processing machines for the production of transverse sealing seams. In that case the carrier surface of the sonotrode and/or the anvil comprises elements which are in the form of a segment of a cylinder. Material processing is effected whenever the carrier surface in the form of a segment of a cylinder comes into engagement with the material. Because the carrier surface does not come into contact continuously with the material to be processed it is difficult to adjust the appropriate welding force with which the sonotrode presses against the anvil. Usually regulating mechanisms are employed here, which for example measure the corresponding force and compare it to a reference value.

Whenever a corresponding transverse sealing seam is to be produced the carrier surface which is in the form of the segment of a cylinder or the structure elements arranged on the carrier surface come into engagement with the material. By virtue of elasticity which cannot be entirely eliminated in the holding arrangement which fixes the sonotrode or the anvil to the machine stand the counteracting force to be applied by the sonotrode and the anvil leads to a relative displacement between the sonotrode and the counterpart tool on the one hand and the machine stand on the other hand. By virtue of the rotation of the processing element the structure element however comes into engagement with the material abruptly so that the structure elements must carry an abrupt shock force. At that moment it is difficult for the force regulating arrangement to set the appropriate force. Due to the abrupt engagement in addition vibration of the sonotrode and possibly also the counterpart tool occurs by virtue of the fixing thereof to the machine stand. In other words, because of the abrupt shock that the structure elements of the anvil exert on the sonotrode by way of the material to be processed relative displacement of the sonotrode with respect to the machine stand occurs.

That is followed by a lessening vibration of the sonotrode about a rest position, in which case the force that the sonotrode exerts on the counterpart tool and thus also the welding result varies with the vibration.

In the same manner if the carrier surface which is in the form of a segment of a cylinder comes into engagement with the material that involves an abrupt relaxation in respect of the sonotrode, which is also unwanted.

Therefore the object of the present invention is to provide a processing element which reduces the abrupt deflection of the sonotrode when the material comes into engagement with and/or comes out of engagement with the carrier surface.

According to the invention that is achieved in that the top side is at least portion-wise convexly curved in the peripheral direction with a radius of curvature which is less than the greatest spacing of the top side from the cylinder axis or comprises at least two surface portions which include an angle <180°.

The curvature in the peripheral direction or the angled configuration of the top side has the result that the pressure loading of the sonotrode as a result of the material coming into engagement with the top side of the structure element takes place gradually or in a plurality of steps whereby the shock force which is transmitted to the sonotrode is reduced.

In a preferred embodiment it is provided that the curvature in the peripheral direction is of a radius which is greater than 50%, preferably greater than 75% and best greater than 90% of the greatest spacing of the top side from the cylinder axis. The smaller the radius of curvature is selected, the correspondingly smaller is the region of the top side, that actually comes into contact with the material to be processed. Depending on the respective situation of use therefore it may be advantageous for the radius of curvature to be as large as possible but less than the greatest spacing of the top side from the cylinder axis.

This ensures that when using the processing element the spacing between the structure element and the sonotrode becomes continuously smaller until the smallest spacing between the sonotrode and the counterpart tool has been implemented.

In a preferred embodiment it is provided that the top side of the structure element has a main portion which is substantially flat or has a convex curvature with a radius of curvature corresponding to the spacing of the main portion from the cylinder axis, and a bevel portion which adjoins the main portion in the peripheral direction and which is angled with respect to the main portion so that main portion and the bevel portion include an angle of less than 180°. In that case the angle is always measured within the material of the structure element.

That has the result that—if the main portion is curved—the bevel portion lies within the envelope defined by the main portion. Basically the gradient or curvature of the top side changes at the transition between the main and bevel portions.

In a preferred embodiment it is provided that the bevel portion is convexly curved in the peripheral direction and more specifically is preferably convexly curved with a radius of curvature which is less than the greatest spacing of the top side from the cylinder axis and greater than half the greatest spacing of the top side from the cylinder axis.

In a further preferred embodiment it is provided that the top side has two bevel portions which adjoin the main portion in the peripheral direction at opposite sides and which are respectively angled with respect to the main portion so that the main portion and the bevel portion respectively include an angle <180°. In the processing operation therefore the top side of the structure element not only has an incoming bevel portion but also an outgoing bevel portion whereby the force applied to the sonotrode by the counterpart tool is also only gradually reduced at the end of processing by the structure element.

Preferably the angle that the main portion and the bevel portion include in a transverse sectional view is greater than 170° and is preferably between 185 and 189.5°. The measure according to the invention in respect of the configuration of the bevel portions ensures in processing of the material that the material is firstly guided between the bevel portion and the sonotrode so that the spacing between the counterpart tool and the sonotrode gradually becomes less until the material is processed by the main portion. It is only when the main portion is processing the material that optimum welding force conditions occur so that actual processing takes place substantially only in the region of the main portion.

In addition it can be provided that the bevel portion is of a width which in the peripheral direction increases in the direction of the main portion. In other words the main portion is adjoined by a bevel portion tapering to a point, thereby ensuring that the force that the counterpart tool exerts on the sonotrode gradually increases.

In a further preferred embodiment it is provided that the side surfaces is inclined with respect to a normal on the carrier surface, wherein preferably the angle of inclination is less than 25° and particularly preferably between 5° and 20°.

The structure elements are advantageously of an elongate shape, the long side being arranged in the peripheral direction. In that case it can be advantageous for more than two structure elements to be arranged in mutually spaced relationship in the axial direction on the carrier surface. A multiplicity of similar structure elements can also be envisaged here.

The invention also further concerns an ultrasonic processing machine comprising a sonotrode and an anvil, wherein the sonotrode and/or the anvil are of a design configuration corresponding to the described processing element.

Further advantages, features and possible uses of the present invention will be apparent from the description hereinafter of a preferred embodiment. In the drawing:

FIG. 1 shows a diagrammatic view of an ultrasonic processing apparatus,

FIGS. 2 through 5 show various views of structure elements of a first embodiment of the invention, FIGS. 6 through 9 show various views of structure elements of a second embodiment of the invention, and FIGS. 10 through 13 show various views of structure elements of a third embodiment of the invention.

FIG. 1 shows a diagrammatic view of an ultrasonic processing apparatus. It has a vibration system 10 which includes a converter 12, an amplitude transformer 14, an ultrasonic sonotrode 16 and a counterpart tool 18. The material 20 to be processed, for example a web of material, is arranged between the sonotrode 16 and the counterpart tool 18. The converter 12 is supplied with an ac voltage by means of an ultrasound generator (not shown).

In the illustrated embodiment signals (U) are taken from the vibration system 10 and fed to a closed-loop control device 24 by way of a feedback section 22. That control device 24 has a PID controller 26. The control device 24 produces an adjustment value (S) which is fed to the vibration system 10 and in particular the converter 12. The vibration system 10 with the control device 24 forms a controlled electrical and mechanical oscillating circuit 28. The control device 24 can be integrated in the ultrasound generator. Reference 30 denotes a processing process, in particular a welding process, which is outside the oscillating circuit 28 as it is not influenced directly by the electrical and mechanical parameters. That processing process 30 is connected to a force sensor 32 with which the pattern of the welding force is detected. The force sensor 32 ascertains a process parameter (p) which is fed to a scaling unit 34. That scaling unit 34 supplies a scaled process parameter (p') which is fed to a connection location 36. That connection location 36 is disposed between the control device and the vibration system 10 so that not only the scaled process parameter (p') but also the adjustment value (S) is fed to the connection location 36. The parameters (p') and (S) which are linked together are fed to the vibration system 10 and in particular the ultrasound generator 12.

It will be seen that the carrier surface of the counterpart tool 18 which is in the form of a roller has two oppositely disposed structure elements 45. They can be for example elongate ribs arranged in the axial direction. In processing of the material web 20 the counterpart tool 18 is rotated about its axis so that the two structure elements 45 come successively into contact with the material web 20 and provide for producing a transverse sealing seam when the material web is clamped between the sonotrode 16 and the structure element 45. The number of structure elements is in principle any number.

Whenever one of the two structure elements 45 is pressed on to the sonotrode 16 by way of the material web 20 that will have the result that an abrupt change in the force is measured by way of the force sensor 32. If however the welding force increases the sonotrode must provide a corresponding counteracting force, that is to say the situation entails an admittedly slight but noticeable elastic deformation of the sonotrode holder. As soon as the structure element 45 is no longer applying pressure to the sonotrode 16 the sonotrode will move back again into its original position.

By virtue of the elastic properties of the sonotrode holder however this will lead to vibrational overshoot so that the time pattern of the welding force is in the form of a damped vibration. As however the welding force is continuously measured by way of the sensor 32 then generally the changed welding force is also fed uninterruptedly by way of the connecting location 36 so that even when the raised portion 45 is not in contact with the material web 20 the damped vibration is fed as a scaled process parameter (p') to the connection location 36 and influences the control.

In order to improve the control performance it has also already been proposed that a trigger device 44 be provided, which by means of a position sensor 43 determines the position of the structure element 45 and actuates the switch 46 in dependence on the determination operation so that the connection location 36 is connected either to the scaled process parameter (p') or to a constant reference value ref.

The control performance can admittedly be improved by that measure, but nothing is changed in respect of the abrupt vibration movement of the sonotrode.

According to the invention therefore it is proposed that a special form be given to the structure elements 45.

FIG. 2 is a view from above on to the top side of a carrier surface 47 in the form of a segment of a cylinder. The carrier surface 47 therefore involves a curvature, the radius of which corresponds to the spacing of the carrier surface from the axis of rotation. Arranged on the carrier surface are two rows comprising a plurality of structure elements 48.

The left-hand side of the carrier surface does not have any structure elements here.

Figure 1:
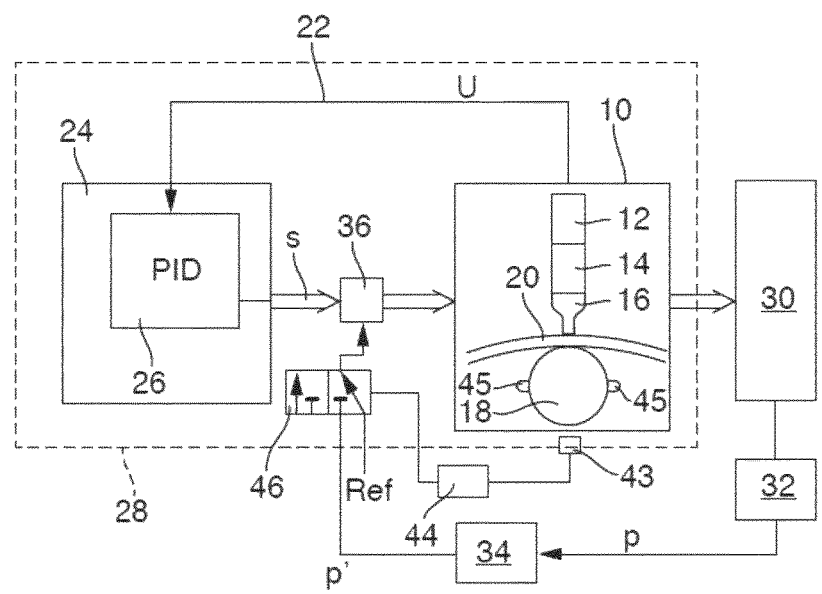
Figure 2:
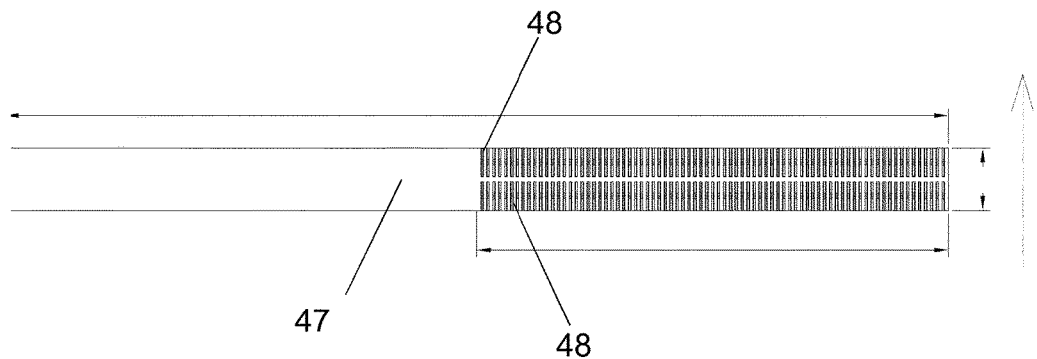
Figure 3:
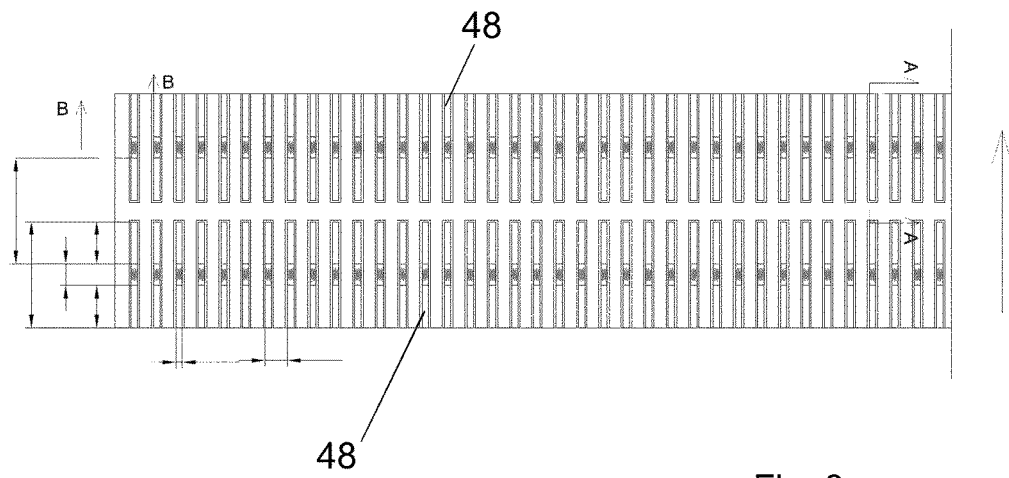
FIG. 3 is a plan view of the structure elements 48 in FIG. 2.
Figure 4:
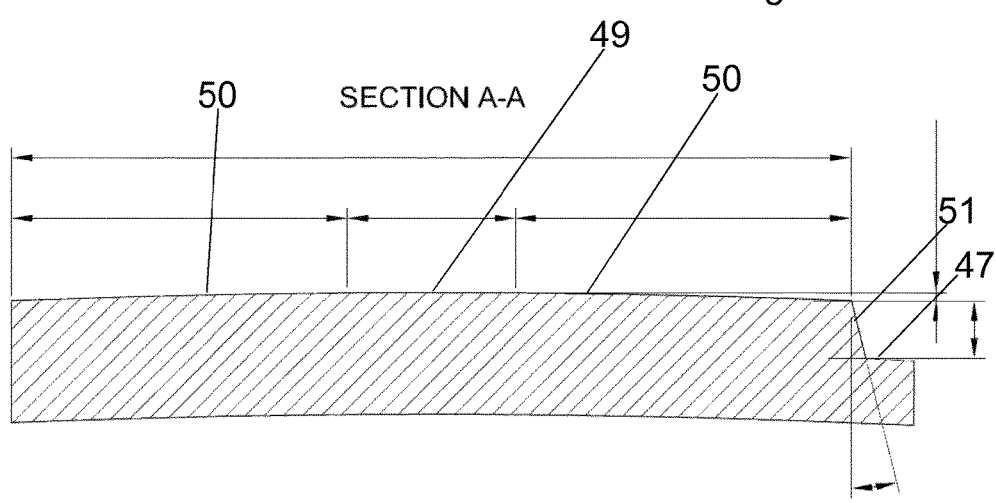
FIG. 4 shows a sectional view along line A-A, that is to say a sectional view perpendicularly to the axis of rotation.
Figure 5:
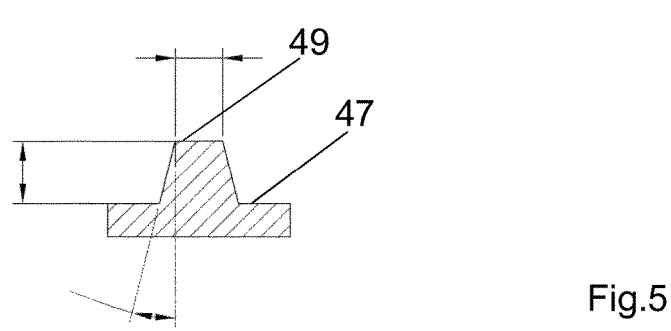
FIG. 5 shows a sectional view along line B-B, that is to say the section plane is parallel to the axis of rotation.
Figure 6:
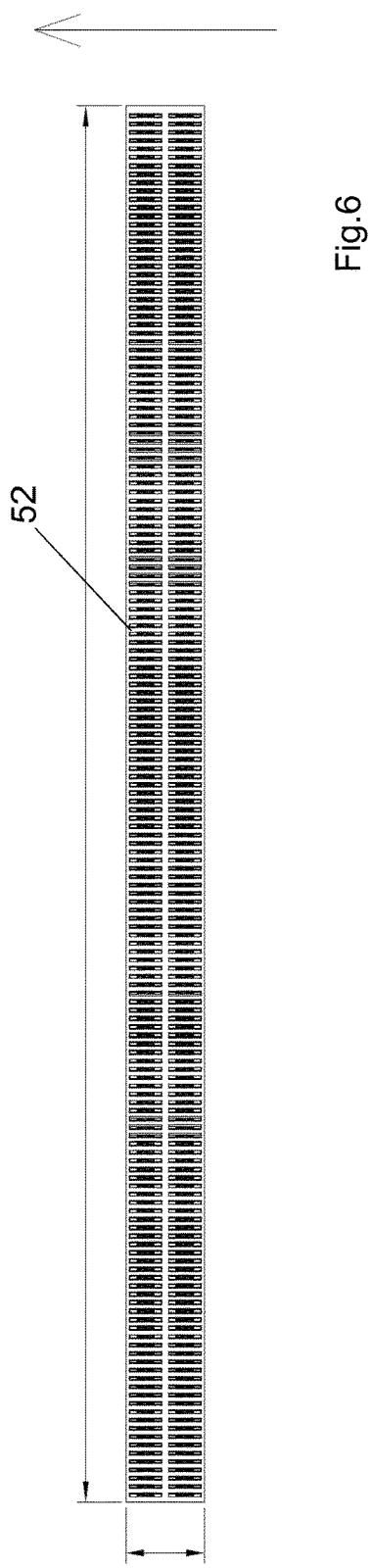
Figure 7:
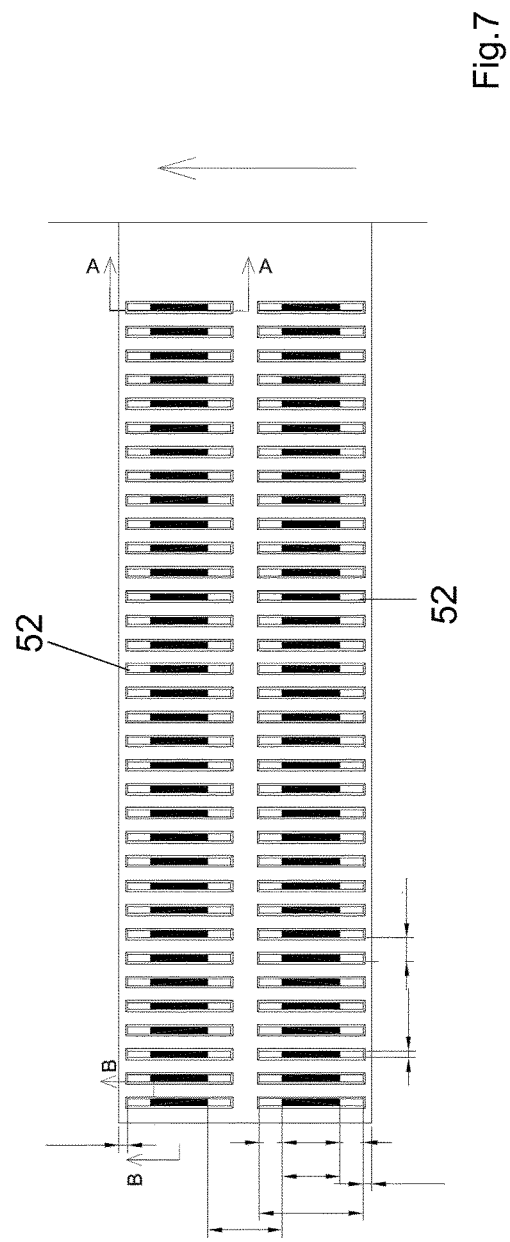
Figure 12:
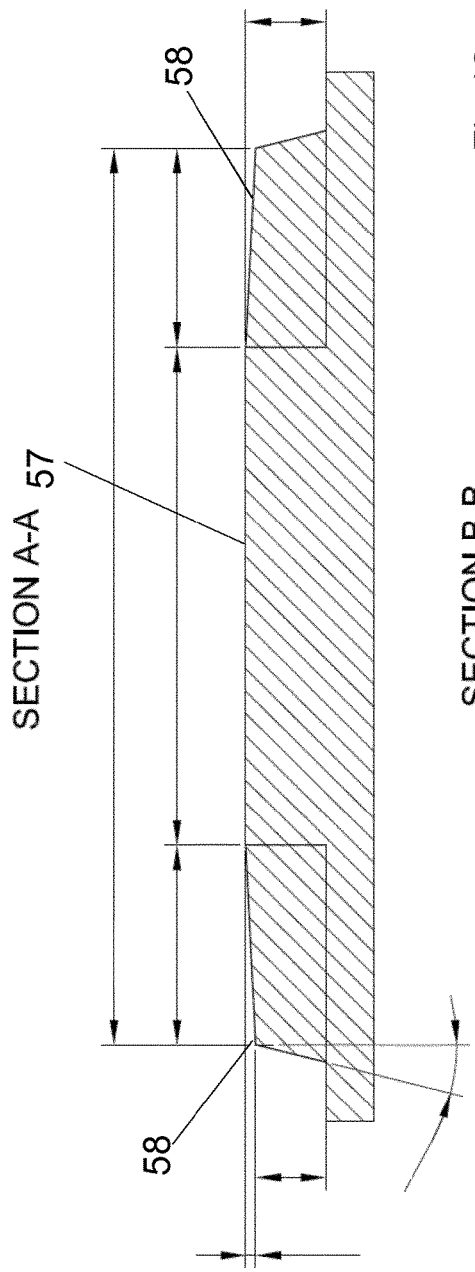
Figure 13:
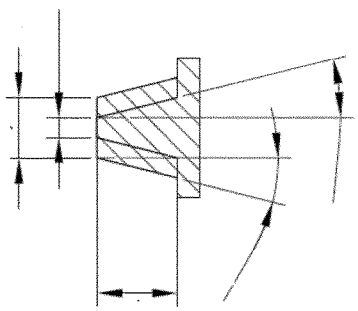

It will be seen that the structure element 48 has a main portion 49 and two bevel portions 50 as well as a side portion 51. The main portion 49 is of a curved configuration and more specifically with a radius of curvature corresponding to the spacing of the main portion from the axis of rotation of the counterpart tool. Adjoining it on both sides in the peripheral direction it is possible to see two bevel portions 50 which are angled with respect to the main portion 49 so that in the illustrated view in FIG. 4 they lie below a tangent to the main portion 49. The angle included in this view by the main portion and the bevel portion is greater than 170° and is preferably between 185° and 189.5°. The measure according to the invention regarding the configuration of the bevel portion 50, in processing of the material, ensures that the material is firstly guided between the bevel portion 50 and the sonotrode so that the spacing between the counterpart tool and the sonotrode gradually becomes smaller until the material is processed by the main portion 49. It is only when the main portion 49 processes the material that optimum welding force conditions occur so that it is substantially only in the region of the main portion that actual processing takes place. After this has occurred the outgoing bevel 50 is responsible for the spacing between the sonotrode and the counterpart tool gradually increasing.

In the illustrated embodiment the side surfaces 51 are inclined with respect to a normal to the carrier surface 47. The angle of inclination is 15° in the illustrated embodiment.

FIGS. 6 through 9 show an alternative embodiment of the structure elements. As can be seen from FIG. 6 which also shows a plan view of a carrier surface in the form of a segment of a cylinder it now has two rows comprising a plurality of structure elements 52 over its entire length. They are shown on an enlarged scale in FIG. 7. FIG. 8 shows a sectional view along line A-A and FIG. 9 shows a sectional view along line B-B. It will be seen that, unlike the embodiment shown in FIGS. 2 through 5, the main portion 53 is markedly larger in comparison with the bevel portions 54. Here too there is a side portion 55 connecting the top side of the structure elements 52 to the carrier surface 47. The bevel portions 54 according to the invention are of no to subordinate significance for the actual material processing operation. They only serve to gradually increase and gradually reduce respectively the spacing between the counterpart tool and the sonotrode and thus the force applied to the sonotrode by the counterpart tool in order to prevent or at least reduce vibration of the sonotrode in the machine stand by virtue of the elasticity of the holder. If, as in the illustrated example, two rows comprising a plurality of structure elements 52 are arranged in succession in the processing direction a minimum spacing must remain between the main portions 53 of the successive structure elements, which is at least twice the length of the bevel portion. In practice it has been found that the spacing between two main portions which are arranged in succession in the peripheral or processing direction is between 2.5 and 3.5 times the length of the bevel portion.

The longer the bevel portion is the correspondingly more pronounced is the effect according to the invention and the correspondingly greater is the necessary spacing relative to the following structure element. In practice therefore a length of the bevel portion of between 10% and 400% of the length of the main portion and preferably between 30% and 200% of the length of the main portion has proven desirable.

Finally FIGS. 10 through 13 show a third embodiment of the structure elements according to the invention. Here too FIG. 10 shows a plan view from above of the carrier surface in the form of a segment of a cylinder, on which two rows having a plurality of structure elements 56 are disposed. The structure elements 56 are shown once again on an enlarged scale in FIG. 11, FIGS. 12 and 13 each showing sectional views along lines A-A and B-B respectively. It will be seen from the plan view in FIG. 11 that the bevel portions 58 are here of a configuration tapering to a point. Otherwise the embodiment substantially corresponds to the two embodiments described hereinbefore.

LIST OF REFERENCES 10 vibration system
12 converter
14 amplitude transformer
16 ultrasound sonotrode
18 counterpart tool
20 material
22 feedback section
24 control device
26 PID controller
28 oscillating circuit
30 processing process
32 force sensor
34 scaling unit
36 connection location
43 position sensor
44 trigger device
45, 48, 52, 56 structure elements
46 switch
47 carrier surface 49, 53, 57 main portion
50, 54, 58 bevel portions
51, 55 side portion

The invention claimed is:

1. A processing element in the form of a sonotrode or an anvil, comprising a carrier surface which is substantially in the form of a cylinder or in the form of a segment of a cylinder and which is intended to come into contact with the material during processing, wherein the processing element is intended to be rotated about its longitudinal axis during processing so that the carrier surface rolls on the material to be processed, wherein arranged on the carrier surface is at least one structure element which projects beyond the carrier surface in the radial direction, wherein the structure element has a top side which is provided to come into contact with the material to be processed, characterised in that the top side is at least portion-wise convexly curved in the peripheral direction with a radius of curvature which is greater than 50% of the greatest spacing of the top side from the cylinder axis and less than the greatest spacing of the top side from the cylinder axis or comprises at least two surface portions which include an angle in the direction of the cylinder axis, which is less than 180° and greater than 170°.

2. A processing element as set forth in claim 1 characterised in that the structure element has a top side and at least one peripherally extending side surface which connects the top side and the carrier surface together.

3. A processing element as set forth in claim 2 characterised in that the top side has a main portion which is substantially flat or has a convex curvature with a radius of curvature corresponding to the spacing of the main portion from the cylinder axis, and a bevel portion which adjoins the main portion in the peripheral direction and which is angled with respect to the main portion so that main portion and the bevel portion include an angle <180° in the direction of the cylinder axis.

4. A processing element as set forth in claim 2 characterised in that the top side has two bevel portions which adjoin the main portion in the peripheral direction at opposite sides and which are respectively angled with respect to the main portion so that the main portion and the bevel portion respectively include an angle <180° in the direction of the cylinder axis.

5. A processing element as set forth in claim 2 characterised in that the angle in the direction of the cylinder axis that the main portion and the bevel portions include in the direction of the cylinder axis is greater than 170°.

6. A processing element as set forth in claim 3 characterised in that the bevel portion is of a length in the peripheral direction, that is between 10% and 400% of the length of the main portion in the peripheral direction.

7. A processing element as set forth in claim 3 characterised in that the bevel portion is of a width which in the peripheral direction increases in the direction of the main portions.

8. A processing element as set forth in claim 1 characterised in that the structure element is of an elongate shape, the long side being arranged in the peripheral direction.

9. A processing element as set forth in claim 1 characterised in that more than two structure elements are arranged in mutually spaced relationship in the axial direction on the carrier surface.

10. A processing element as set forth in claim 1 characterised in that two structure elements are arranged in succession but in mutually spaced relationship in the peripheral direction on the carrier surface.

11. A processing element as set forth in claim 3 characterised in that the bevel portion is at least portion-wise convexly curved in the peripheral direction with a radius of curvature which is less than the greatest spacing of the top side from the cylinder axis and greater than half the greatest spacing of the top side from the cylinder axis.

12. A processing element as set forth in claim 1 characterised in that the top side is at least portion-wise convexly curved in the peripheral direction with a radius of curvature which is less than the greatest spacing of the top side from the cylinder axis and greater than half the greatest spacing of the top side from the cylinder axis.

13. An ultrasonic processing machine comprising a sonotrode and an anvil characterised in that the sonotrode and/or anvil is as set forth in claim 1.

14. A processing element as set forth in claim 3 characterised in that the bevel portion is of a length in the peripheral direction, that is between 30% and 200% of the length of the main portion in the peripheral direction.

* * * * *